(12) United States Patent
Kim et al.

(10) Patent No.: US 12,452,295 B1
(45) Date of Patent: Oct. 21, 2025

(54) AI MULTI-DOMAIN INTEGRATED SYSTEM AND METHOD FOR AUTOMATIC GENERATION OF CYBER CRISIS SCENARIO

(71) Applicant: KOREA INTERNET & SECURITY AGENCY, Naju-si (KR)

(72) Inventors: Seo Yeon Kim, Naju-si (KR); Joon Hyung Lim, Naju-si (KR); Dong Hwan Oh, Naju-si (KR); Tae Eun Kim, Naju-si (KR); Sae Woom Lee, Naju-si (KR); Seul Ki Choi, Naju-si (KR); Tae Hyeon Kim, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 19/183,089

(22) Filed: Apr. 18, 2025

(30) Foreign Application Priority Data

Feb. 19, 2025  (KR) .......................... 10-2025-0021397

(51) Int. Cl.
*H04L 9/40* (2022.01)
(52) U.S. Cl.
CPC ................................ *H04L 63/1441* (2013.01)
(58) Field of Classification Search
CPC . H04L 63/1425; H04L 41/16; H04L 63/1416; H04L 63/20; H04L 63/1441; G06F 21/577; G06F 2221/034
See application file for complete search history.

(56) References Cited

U.S. PATENT DOCUMENTS 10,600,335 B1\* 3/2020 Donovan ................. G09B 5/12
12,170,685 B2\* 12/2024 Manor ................ H04L 63/1416
(Continued)

FOREIGN PATENT DOCUMENTS

KR      10-2019-0085661 A    7/2019
KR         102008707 B1      8/2019
(Continued)

OTHER PUBLICATIONS

Ji et al., "Insider Threats Risk Warning and Traceability Based on User Behavior Entity Analysis and Knowledge Graph," 2023 5th International Conference on Robotics, Intelligent Control and Artificial Intelligence (RICAI) Year: 2023 | Conference Paper | Publisher: IEEE.\*

(Continued)

*Primary Examiner* — Roderick Tolentino
(74) *Attorney, Agent, or Firm* — Studebaker Brackett PLLC (57) ABSTRACT

There is provided a method for automatically generating a cyber crisis scenario, performed by a computing system. The method may comprise classifying types of content included in a cyber crisis report and extracting image data and text data from the cyber crisis report, inputting the image data into an image processing model and extracting attack procedure/behavior information included in the image data, inputting the text data into a text processing model and generating structured attack procedure-related data from each attack procedure included in the text data, generating threat behavior data corresponding to the attack procedure-related data, and merging the threat behavior data with the attack procedure-related data, matching the attack procedure-related data to the attack procedure/behavior information and generating a cyber crisis scenario template and automatically generating a cyber crisis scenario based on the (Continued)

attack procedure-related data and the cyber crisis scenario template.

17 Claims, 7 Drawing Sheets

(56) References Cited

U.S. PATENT DOCUMENTS

| | | | |
|---|---|---|---|
| 2020/0065387 A1 | 2/2020 | Matthews et al. | |
| 2022/0279015 A1* | 9/2022 | Sambamoorthy | H04L 51/212 |
| 2023/0344868 A1* | 10/2023 | Kaligotla | H04L 63/1416 |
| 2024/0411994 A1* | 12/2024 | Siracusano | G06F 40/205 |
| 2024/0422187 A1* | 12/2024 | Shah | H04L 63/1408 |
| 2025/0030725 A1* | 1/2025 | Fellows | H04L 63/1433 |
| 2025/0055859 A1* | 2/2025 | Fitzpatrick | H04L 63/1416 |
| 2025/0126135 A1* | 4/2025 | Cho | H04L 63/1441 |
| 2025/0193210 A1* | 6/2025 | Khan | H04L 63/1408 |

FOREIGN PATENT DOCUMENTS

| | | |
|---|---|---|
| KR | 102047929 B1 | 11/2019 |
| KR | 10-2023-0089822 A | 6/2023 |
| KR | 10-2024-0067476 A | 5/2024 |
| KR | 10-2024-0073317 A | 5/2024 |
| KR | 102698547 B1 | 8/2024 |

OTHER PUBLICATIONS

Faragrallah et al., "Investigation of Chaotic Image Encryption in Spatial and FrFT Domains for Cybersecurity Applications," IEEE Access Year: 2020 | vol. 8 | Journal Article | Publisher: IEEE.*

An Office Action mailed by the Korean Intellectual Property Office on May 11, 2025, which corresponds to Korean Patent Application No. 10-2025-0021397 and is related to U.S. Appl. No. 19/183,089.

* cited by examiner

AI MULTI-DOMAIN INTEGRATED SYSTEM AND METHOD FOR AUTOMATIC GENERATION OF CYBER CRISIS SCENARIO

CROSS-REFERENCE TO RELATED APPLICATION

This application claims priority from Korean Patent Application No. 10-2025-0021397 filed on Feb. 19, 2025 in the Korean Intellectual Property Office, and all the benefits accruing therefrom under 35 U.S.C. 119, the contents of which in its entirety are herein incorporated by reference.

BACKGROUND

1. Field

The present disclosure relates to an artificial intelligence (AI) multi-domain integrated system and method for automatically generating a cyber crisis scenario, and more specifically, to a method and system for automatically generating a cyber crisis scenario from content included in a cyber crisis report.

2. Description of the Related Art

Existing methods for generating cyber crisis scenarios are largely dependent on manual processes, which is inefficient. The process where experts analyze past cases and conduct simulations to draft scenarios requires significant time and human resources, making it difficult to reflect the rapidly evolving cyber threat landscape in real time. Additionally, conventional methods do not immediately incorporate the latest threat elements, which may weaken an organization's security response capabilities.

Accordingly, there is a demand for technology that utilizes multimodal data to automatically generate cyber crisis scenarios. By leveraging such technology, the latest threats can be promptly reflected, crisis situations can be more accurately predicted, and the efficiency of security response processes can be enhanced. An automated scenario generation system can enhance an organization's security capabilities and facilitate the establishment of a more effective proactive defense framework.

SUMMARY

One objective of the present disclosure is to provide a method and system for the automatic generation of a cyber crisis scenario using content included in a cyber crisis report.

Another objective of the present disclosure is to provide a method and system for the automatic generation of a cyber crisis scenario that improves reusability by generating a cyber crisis scenario template using content from a crisis report and then generating a cyber crisis scenario based on the generated template.

The objectives of the present disclosure are not limited to those mentioned above, and other objectives not explicitly stated will be clearly understood by those skilled in the art based on the following description.

According to an aspect of the present disclosure, there is provided a method for automatically generating a cyber crisis scenario, performed by a computing system, the method may comprise classifying types of content included in a cyber crisis report and extracting image data and text data from the cyber crisis report, inputting the image data into an image processing model and extracting attack procedure/behavior information included in the image data, inputting the text data into a text processing model and generating structured attack procedure-related data from each attack procedure included in the text data, generating threat behavior data corresponding to the attack procedure-related data using unique identification information of Tactics, Techniques, and Procedures (TTPs) defined in the MITRE ATT&CK framework, and merging the threat behavior data with the attack procedure-related data, matching the attack procedure-related data to the attack procedure/behavior information and generating a cyber crisis scenario template and automatically generating a cyber crisis scenario based on the attack procedure-related data and the cyber crisis scenario template.

In some embodiments, the extracting the attack procedure/behavior information may comprise defining components included in the image data and relationships between the components; and extracting the attack procedure/behavior information based on the components and the relationships.

In some embodiments, the generating the structured attack procedure-related data may comprise generating unique execution order identification information for a first attack procedure and a second attack procedure included in the text data based on an execution sequence.

In some embodiments, the generating the cyber crisis scenario template may comprise determining whether content of the first and second attack procedures includes all content of the attack procedures recorded in the cyber crisis report based on the attack procedure/behavior information; and determining, based on a result of the determination, whether the first and second attack procedures match the respective attack procedures recorded in the cyber crisis report.

In some embodiments, the attack procedure-related data may comprise information on a targeted organization, information on an executed attack, and tags for the executed attack.

In some embodiments, the generating the threat behavior data corresponding to the attack procedure-related data may comprise performing semantic analysis on the information on the executed attack; and matching the executed attack to a corresponding TTP identifier (ID) defined in the MITRE ATT&CK framework based on a result of the semantic analysis In some embodiments, the generating the cyber crisis scenario template may comprise verifying validity of information as to whether the cyber crisis scenario template includes all the content of the cyber crisis report; and verifying appropriateness of information as to whether the threat behavior data is properly matched to TTPs defined in the MITRE ATT&CK framework.

In some embodiments, the automatically generating the cyber crisis scenario may comprise automatically generating the cyber crisis scenario only when both the validity and appropriateness of the information have been successfully verified.

In some embodiments, the automatically generating the cyber crisis scenario may comprise adding execution elements corresponding to the threat behavior data included in the cyber crisis scenario template.

According to the aforementioned and other embodiments of the present disclosure, a cyber crisis scenario automatic generation system may comprise a communication interface, a memory configured to load a computer program and at least one processor configured to execute the computer program, wherein the computer program may include instructions for performing operations of: classifying types of content included in a cyber crisis report and extracting image data and text data from the cyber crisis report; inputting the image data into an image processing model and extracting attack procedure/behavior information included in the image data; inputting the text data into a text processing model and generating structured attack procedure-related data from each attack procedure included in the text data; generating threat behavior data corresponding to the attack procedure-related data using unique identification information of Tactics, Techniques, and Procedures (TTPs) defined in the MITRE ATT&CK framework, and merging the threat behavior data with the attack procedure-related data; matching the attack procedure-related data to the attack procedure/behavior information and generating a cyber crisis scenario template; and automatically generating a cyber crisis scenario based on the attack procedure-related data and the cyber crisis scenario template.

In some embodiments, the operation of extracting the attack procedure/behavior information may comprise defining components included in the image data and relationships between the components; and extracting the attack procedure/behavior information based on the components and the relationships.

In some embodiments, the operation of generating the structured attack procedure-related data may comprise generating unique execution order identification information for a first attack procedure and a second attack procedure included in the text data based on an execution sequence.

In some embodiments, the operation of generating the cyber crisis scenario template may comprise determining whether content of the first and second attack procedures includes all content of the attack procedures recorded in the cyber crisis report based on the attack procedure/behavior information; and determining, based on a result of the determination, whether the first and second attack procedures match the respective attack procedures recorded in the cyber crisis report.

In some embodiments, the attack procedure-related data may comprise information on a targeted organization, information on an executed attack, and tags for the executed attack.

In some embodiments, the operation of generating the threat behavior data corresponding to the attack procedure-related data may comprise performing semantic analysis on the information on the executed attack; and matching the executed attack to a corresponding TTP identifier (ID) defined in the MITRE ATT&CK framework based on a result of the semantic analysis.

In some embodiments, the operation of generating the cyber crisis scenario template may comprise verifying validity of information as to whether the cyber crisis scenario template includes all the content of the cyber crisis report; and verifying appropriateness of information as to whether the threat behavior data is properly matched to TTPs defined in the MITRE ATT&CK framework.

In some embodiments, the operation of automatically generating the cyber crisis scenario may comprise automatically generating the cyber crisis scenario only when both the validity and appropriateness of the information have been successfully verified.

In some embodiments, the operation of automatically generating the cyber crisis scenario may comprise adding execution elements corresponding to the threat behavior data included in the cyber crisis scenario template.

According to the aforementioned and another embodiments of the present disclosure, a computer-readable recording medium storing a computer program that may perform, in conjunction with a computing device, operations of: classifying types of content included in a cyber crisis report and extracting image data and text data from the cyber crisis report, inputting the image data into an image processing model and extracting attack procedure/behavior information included in the image data, inputting the text data into a text processing model and generating structured attack procedure-related data from each attack procedure included in the text data, generating threat behavior data corresponding to the attack procedure-related data using unique identification information of Tactics, Techniques, and Procedures (TTPs) defined in the MITRE ATT&CK framework, and merging the threat behavior data with the attack procedure-related data, matching the attack procedure-related data to the attack procedure/behavior information and generating a cyber crisis scenario template and automatically generating a cyber crisis scenario based on the attack procedure-related data and the cyber crisis scenario template.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

Figure 1:
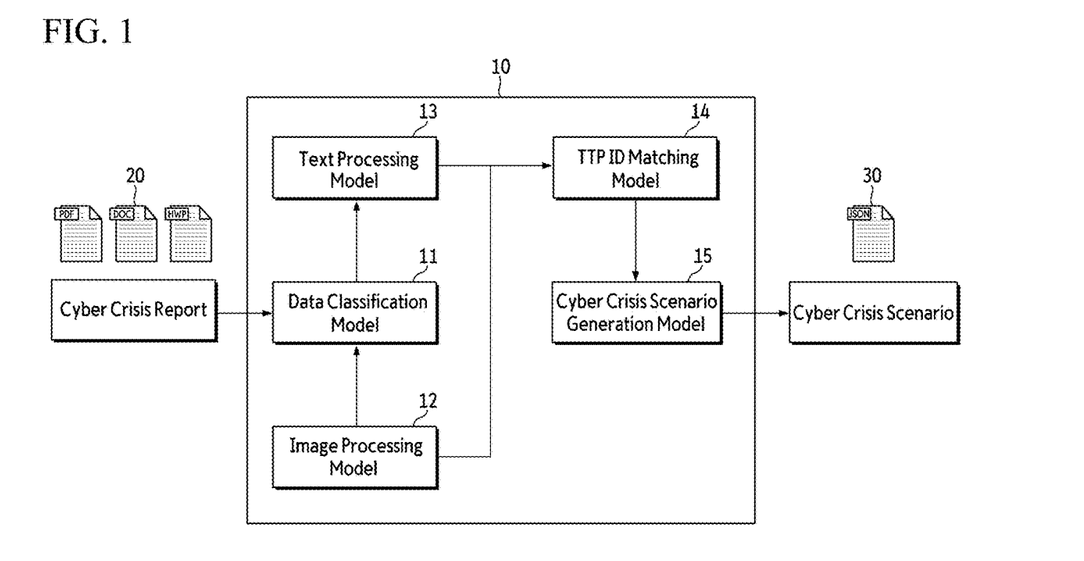
FIG. 1 is a diagram illustrating the configuration and operation of a cyber crisis scenario automatic generation system according to some embodiments of the present disclosure.

The configuration and operation of a cyber crisis scenario automatic generation system according to some embodiments of the present disclosure will hereinafter be described with reference to FIG. 1. FIG. 1 is a diagram illustrating the configuration and operation of a cyber crisis scenario automatic generation system according to some embodiments of the present disclosure.

Referring to FIG. 1, a cyber crisis scenario automatic generation system 10 may include a data classification model 11, an image processing model 12, a text processing model 13, a cyber crisis Tactics, Techniques, and Procedures Identifier (TTP ID) matching model 14, and a cyber crisis scenario generation model 15, but the present disclosure is not limited thereto. In some embodiments, the cyber crisis scenario automatic generation system 10 may be designed to further include additional modules/devices/systems that are not illustrated in FIG. 1. Alternatively, the cyber crisis scenario automatic generation system 10 may be designed to exclude at least some of the components illustrated in FIG. 1.

Referring to FIG. 1, the cyber crisis scenario automatic generation system 10 may receive a cyber crisis report 20 as input and generate a cyber crisis scenario 30 using the content included in the cyber crisis report 20. The cyber crisis report 20, a document created by an organization such as an enterprise or a government agency to respond to a cybersecurity threat or incident, may be an official document issued by a certified institution, recording detailed information on a cyberattack (i.e., the attack method, procedure, target, etc.), the cause of the incident, affected assets, and response measures for threat identification and analysis.

The data classification model 11 may classify and extract the types of content included in the cyber crisis report into image data and text data. The cyber crisis scenario automatic generation system 10 may input the image data into the image processing model 12 and generate attack procedure/behavior information included in the image data. The cyber crisis scenario automatic generation system 10 may input the text data into the text processing model 13 and generate structured attack procedure-related data from each attack procedure included in the text data. The term "attack procedure" refers to an attack performed by an attacker, classified as a logical unit. This will be described later in detail with reference to FIGS. 3 through 5.

Meanwhile, the image processing model 12 and the text processing model 13 are artificial intelligence (AI) systems capable of processing and understanding data composed of text and images, respectively. The image processing model 12 and the text processing model 13 may perform tasks such as generating images based on text descriptions or analyzing images to produce textual descriptions. Those skilled in the relevant art are already familiar with the technology related to the image processing model 12 and the text processing model 13, and thus a detailed description thereof will be omitted.

The TTP ID matching model 14 may generate a cyber crisis scenario template using the generated attack procedure-related data and the attack procedure/behavior information. The cyber crisis scenario template may be generated from a single cyber crisis report 20. The cyber crisis scenario automatic generation system 10 may use the generated cyber crisis scenario template to generate a cyber crisis scenario for any later-received similar cyber crisis report to the cyber crisis report 20. Accordingly, the cyber crisis scenario automatic generation system 10 may reduce resource consumption and enhance reusability by utilizing the cyber crisis scenario template, rather than generating a new cyber crisis scenario each time. This will be described later in detail with reference to FIGS. 5 and 6.

The cyber crisis scenario generation model 15 may verify the validity of information as to whether the cyber crisis scenario template includes all content of the cyber crisis report 20 and the appropriateness of information as to whether threat behavior data corresponding to the attack procedure-related data is properly matched to Tactics, Techniques, and Procedures (TTPs) defined in the MITRE ATT&CK framework. This will be described later in detail with reference to FIG. 6.

The cyber crisis scenario generation model 15 may automatically generate a cyber crisis scenario based on the attack procedure-related data and the cyber crisis scenario template.

Each of the components of the cyber crisis scenario automatic generation system 10 may be implemented by at least one computing device. For example, all functions of the cyber crisis scenario automatic generation system 10 may be implemented in a single computing device, or a first function of the cyber crisis scenario automatic generation system 10 may be implemented in a first computing device while a second function of the cyber crisis scenario automatic generation system 10 may be implemented in a second computing device. Alternatively, a specific function of the cyber crisis scenario automatic generation system 10 may be implemented across multiple computing devices.

Hereinafter, it is assumed that all steps and operations of methods to be described below are performed by the aforementioned cyber crisis scenario automatic generation system 10. Therefore, if the subject performing a specific step/operation is omitted, it may be understood that the cyber crisis scenario automatic generation system 10 performs the specific step/operation. However, in an actual environment, some steps/operations of the methods to be described below may be performed by other computing devices.

Additionally, for convenience, the cyber crisis scenario automatic generation system 10 may be abbreviated as "the scenario automatic generation system 10."

Figure 2:
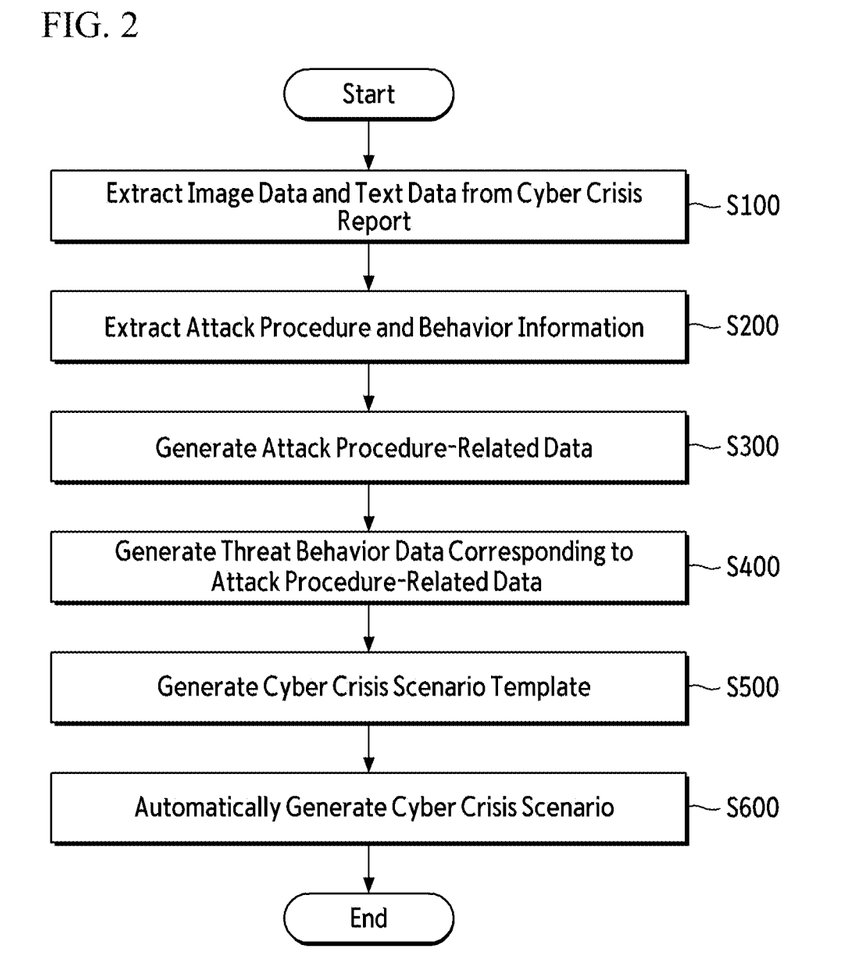
FIG. 2 is a flowchart illustrating a cyber crisis scenario automatic generation method according to some embodiments of the present disclosure.

A cyber crisis scenario automatic generation method according to some embodiments of the present disclosure will hereinafter be described with reference to FIG. 2. FIG. 2 is a flowchart illustrating a cyber crisis scenario automatic generation method according to some embodiments of the present disclosure.

Referring to FIG. 2, the data classification model 11 may classify the types of content included in a cyber crisis report 20 and extract image data and text data from the cyber crisis report 20 (S100). The cyber crisis report 20, a document created by an organization such as an enterprise or a government agency to respond to a cybersecurity threat or incident, may be an official document issued by a certified institution, recording detailed information on a cyberattack (i.e., the attack method, procedure, target, etc.), the cause of the incident, affected assets, and response measures for threat identification and analysis.

The scenario automatic generation system 10 may input the image data extracted from the cyber crisis report 20 into the image processing model 12 and extract attack procedure/behavior information included in the image data (S200). The term "attack procedure" refers to an attack performed by an attacker, classified as a logical unit. The attack procedure/behavior information may be information that enables understanding of overall attack procedures and their context included in the image data.

Figure 3:
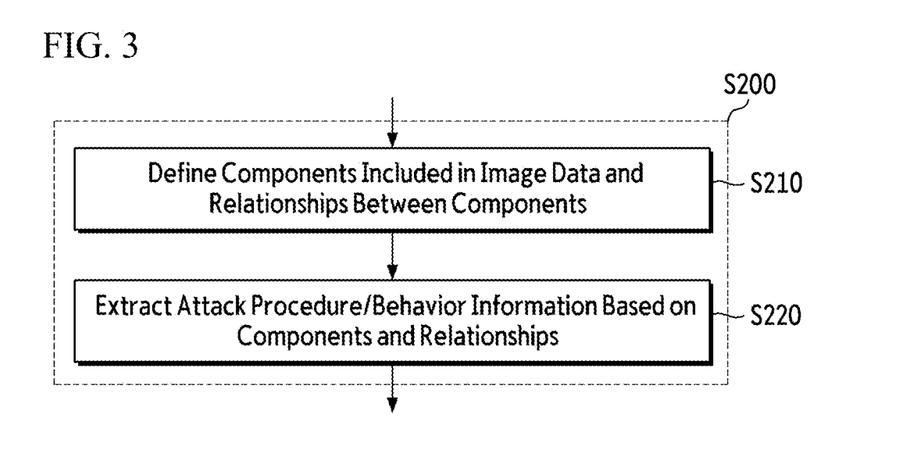
FIG. 3 is a detailed flowchart illustrating specific operations of the cyber crisis scenario automatic generation method according to some embodiments of the present disclosure.

A method for extracting attack procedure/behavior information according to some embodiments of the present disclosure will hereinafter be described with reference to FIG. 3. FIG. 3 is a detailed flowchart illustrating specific operations of the cyber crisis scenario automatic generation method according to some embodiments of the present disclosure.

Referring to FIG. 3, the image processing model 12 may define components included in the image data and the relationships between the components (S210). The image processing model 12 may identify a diagram or attack flowchart included in the image data and may adjust image resolution or remove noise by performing preprocessing on the diagram. The image processing model 12 may utilize Optical Character Recognition (OCR) technology to extract and analyze text from the image data and detect objects within the image data to identify components. By analyzing the directionality of arrows or lines between the components, the image processing model 12 may define the relationships between the components.

The scenario automatic generation system 10 may extract attack procedure/behavior information based on the components and their relationships (S220). The attack procedure/behavior information may be information that enables understanding of the overall attack procedures and their context included in the image data.

FIG. 3 will hereinafter be further explained with reference to some embodiments.

The scenario automatic generation system 10 may input image data into the image processing model 12 and define the components included in the image data and their relationships. For example, the scenario generation system 10 may analyze image data (e.g., components in an attack flowchart) and text data within the cyber crisis report 20 to identify an attacker's attack procedure/behavior information. By analyzing the directionality of arrows or lines between the components, the image processing model 12 may define the relationships between the components.

Thereafter, the scenario automatic generation system 10 may extract attack procedure/behavior information based on the components and their relationships. The scenario automatic generation system 10 may generate an attack flowchart as exemplary attack procedure/behavior information. The attack flowchart is a document that provides information for understanding the overall attack procedure and its context, including attack stages and descriptions of the attack stages. The scenario automatic generation system 10 may generate a cyber crisis scenario template based on the attack flowchart and attack procedure-related data, which will be described later. However, the present disclosure is not limited to this, and the scenario automatic generation system 10 may extract attack procedure/behavior information in various other forms.

According to this embodiment, additional analysis may be performed not only on the text data but also on the image data included in the cyber crisis report 20, thereby improving the understanding of complex attack procedures. This, in turn, minimizes errors in the process of automatically generating a cyber crisis scenario and enhances accuracy.

The description will now return to FIG. 2.

The scenario automatic generation system 10 may input the text data extracted from the cyber crisis report 20 into the text processing model 13 and generate structured attack procedure-related data from each attack procedure included in the text data (S300). The attack procedure-related data may include information on a targeted organization, information on an executed attack, and tags for the executed attack. The tags for the executed attack may refer to representative information that identifies keywords for the overall attack, but the present disclosure is not limited thereto, and the attack procedure-related data may include various types of information. The attack procedure-related data may be structured data in JSON format.

Thereafter, the scenario automatic generation system 10 may generate threat behavior data corresponding to the attack procedure-related data using unique identification information for TTPs defined in the MITRE ATT&CK framework and merge the generated threat behavior data with the attack procedure-related data (S400).

The TTPs defined in the MITRE ATT&CK framework systematically categorize the tactics, techniques, and procedures used by cyber attackers. Tactics refer to the objective of an attack (e.g., initial access, privilege escalation, etc.), techniques refer to specific methods used to achieve that objective (e.g., phishing, process injection, etc.), and procedures describe how real-world attack groups implement these techniques in practice. This framework is widely used by security researchers and organizations to analyze attack behaviors and develop defense strategies. Those skilled in the relevant art are already familiar with this framework, and thus, a detailed description thereof will be omitted.

The threat behavior data correspond to the attack procedure-related data and may include information on threat behaviors defined in the MITRE ATT&CK framework's unique identification information for TTPs. This may include the names of threat behaviors as well as information on the tactics, techniques, and procedures used.

Thereafter, the TTP ID matching model 14 may match the attack procedure-related data to the attack procedure/behavior information extracted from the image data and generate a cyber crisis scenario template (S500). The cyber crisis scenario template may be generated from a single cyber crisis report 20. The cyber crisis scenario automatic generation system 10 may use the generated cyber crisis scenario template to generate a cyber crisis scenario for any later-received similar cyber crisis report to the cyber crisis report 20. Accordingly, the cyber crisis scenario automatic generation system 10 may reduce resource consumption and enhance reusability by utilizing the cyber crisis scenario template, rather than generating a new cyber crisis scenario each time.

Figure 4:
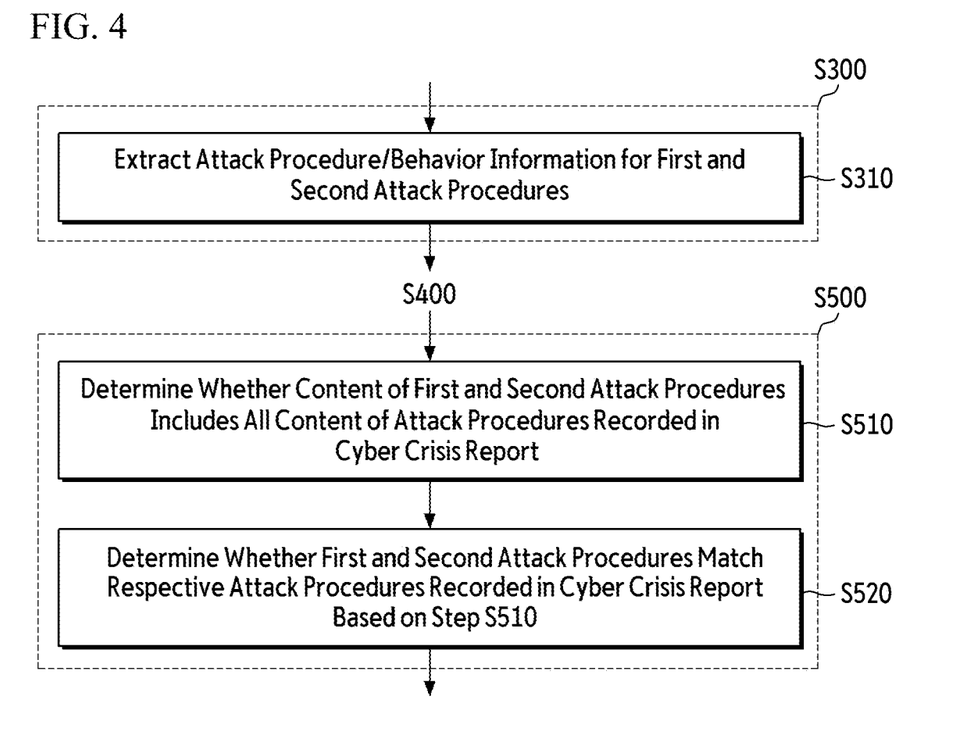
FIG. 4 is a detailed flowchart illustrating specific operations of the cyber crisis scenario automatic generation method according to some embodiments of the present disclosure.

A method for generating attack procedure-related data according to some embodiments of the present disclosure will hereinafter be described with reference to FIG. 4. FIG. 4 is a detailed flowchart illustrating specific operations of the cyber crisis scenario automatic generation method according to some embodiments of the present disclosure.

Referring to FIG. 4, the scenario automatic generation system 10 may extract attack procedure/behavior information for a first attack procedure and a second attack procedure included in text data (S310).

Specifically, the scenario automatic generation system 10 may input text data into the text processing model 13 and generate structured attack procedure-related data from each of the first and second attack procedures included in the text data.

In one embodiment, the scenario automatic generation system 10 may generate unique execution order identification information for the first and second attack procedures included in the text data according to their execution sequence. The attack procedure-related data may include, for each of the first and second attack procedures, unique execution order identification information, attack procedure description, attack procedure action information (e.g., execution methods, execution tools, targets, etc.), and unique identification information for TTPs defined in the MITRE ATT&CK framework, but the present disclosure is not limited thereto. That is, the attack procedure-related data may include various other information than those set forth herein.

The description will now return to FIG. 4.

After step S310, the scenario automatic generation system 10 may generate threat behavior data corresponding to the attack procedure-related data using the unique identification information for TTPs defined in the MITRE ATT&CK framework and merge the generated threat behavior data with the attack procedure-related data (S400).

Figure 5:
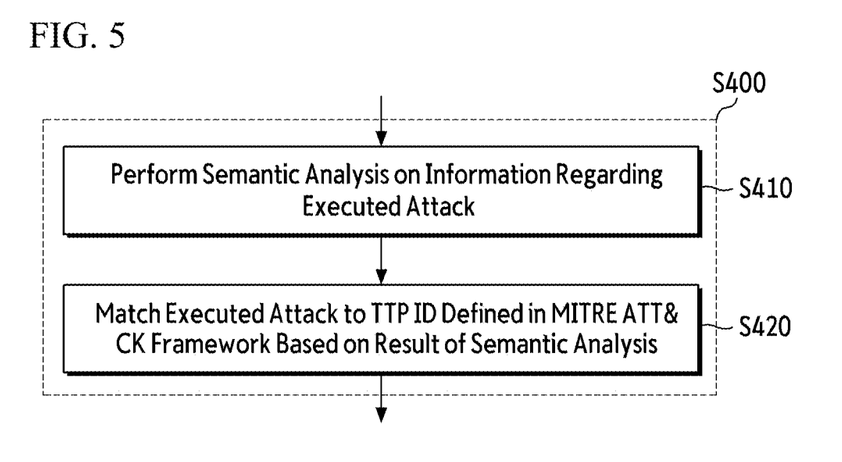
FIG. 5 is a detailed flowchart illustrating specific operations of the cyber crisis scenario automatic generation method according to some embodiments of the present disclosure.

A method for generating threat behavior data according to some embodiments of the present disclosure will hereinafter be described with reference to FIG. 5. FIG. 5 is a detailed flowchart illustrating specific operations of the cyber crisis scenario automatic generation method according to some embodiments of the present disclosure.

Referring to FIG. 5, the text processing model 13 may perform semantic analysis on information on an executed attack (S410). Semantic analysis, which is a process in natural language processing (NLP) that interprets and understands the meaning of text, is used to determine the semantic relationship in structured attack procedure-related data regarding an executed attack, and may also be applied to resolving word ambiguity, conducting entity recognition, or performing sentiment analysis while considering context.

Thereafter, the TTP ID matching model 14 may match the executed attack to a corresponding TTP ID defined in the MITRE ATT&CK framework based on the result of semantic analysis (S420).

For example, the scenario automatic generation system 10 may perform semantic analysis on a first attack procedure and a second attack procedure. The scenario automatic generation system 10 may input attack information on the first and second attack procedures into the text processing model 13 and obtain the results of the semantic analysis for the first and second attack procedure. The attack information on the first and second attack procedures may include unique execution order identification information, attack procedure description, and attack procedure action information (e.g., execution methods, execution tools, targets, etc.) for the first and second attack procedures.

Thereafter, the TTP ID matching model 14 may compare the results of the semantic analysis with a table of TTPs defined in the MITRE ATT&CK framework and match the first and second attack procedures to corresponding TTP IDs defined in the MITRE ATT&CK framework. For example, the scenario automatic generation system 10 may compare the result of the semantic analysis for the first attack procedure with the TTPs defined in the MITRE ATT&CK framework and match the first attack procedure to a TTP ID of "1566.001," a TTP name of "Phishing: Spear Phishing Attachment," and the tactic ["Initial Access"].

The scenario automatic generation system 10 may compare the result of the semantic analysis for the second attack procedure with the TTPs defined in the MITRE ATT&CK framework and match the second attack procedure to a TTP ID of "T1204.002," a TTP name of "User Execution: Malicious File," and the tactic ["Execution"]. Alternatively, the scenario automatic generation system 10 may compare the result of the semantic analysis for the second attack procedure with the TTPs defined in the MITRE ATT&CK framework and match the second attack procedure to a TTP ID of "T1569.002," a TTP name of "System Services: Service Execution," and the tactic ["Execution"].

The description will now return to FIG. 4.

After step S400, the TTP ID matching model 14 may determine whether the content of the first and second attack procedures includes all the content of the attack procedures recorded in the cyber crisis report 20 (S510) based on the attack procedure/behavior information extracted in step S310. For example, the TTP ID matching model 14 may determine whether the attack procedures in the cyber crisis report 20 match the respective attack procedures in the generated cyber crisis scenario template based on the unique execution order identification information. Using this manner, the TTP ID matching model 14 may determine whether the content of the first and second attack procedures includes all the content of the attack procedures recorded in the cyber crisis report 20 based on the unique execution order identification information.

Thereafter, based on the result of step S510, the TTP ID matching model 14 may determine whether the first and second attack procedures match the respective attack procedures recorded in the cyber crisis report 20. That is, the TTP ID matching model 14 may determine whether the first and second attack procedures match the respective attack procedures recorded in the cyber crisis report 20 according to their execution order.

Is this embodiment, additional analysis is performed not only on the text data but also on the image data included in the cyber crisis report 20, thereby improving the understanding of complex attack procedures. The scenario automatic generation system 10 may determine whether the result of the analysis of the text data aligns with the result of the analysis of the image data, and based on the result of this determination, generate a cyber crisis scenario template with a high level of accuracy. Accordingly, this embodiment reduces errors in the scenario automatic generation process and improves accuracy.

The scenario automatic generation system 10 may generate a cyber crisis scenario template using the method illustrated in FIG. 4. The cyber crisis scenario template may be generated based on the result of the matching between the attack procedure-related data and the attack procedure/behavior information extracted from the image data. The cyber crisis scenario template may include unique template identification information, a description of the cyber crisis scenario template, tags for an attack performed in the cyber crisis scenario template, information on a targeted organization, information on targeted assets, and attack procedure-related data, but the present disclosure is not limited thereto. That is, the cyber crisis scenario template may include other information than those set forth herein.

The cyber crisis scenario template abstracts attack procedures so that they are not dependent on a specific environment. The scenario automatic generation system 10 may improve reusability of the cyber crisis scenario template by generating various cyber crisis scenarios using the cyber crisis scenario template. Meanwhile, each cyber crisis scenario focuses on reproducibility for an organization's actual incident response. Accordingly, in this embodiment, the scenario automatic generation system 10 may avoid repeating all steps for generating a cyber crisis scenario for identical or similar cases and may instead reuse the cyber crisis scenario template to construct a cyber crisis scenario. That is, according to this embodiment, the scenario automatic generation system 10 may manage and generate the cyber crisis scenario template so that it can be referenced when generating a cyber crisis scenario, rather than generating an entire cyber crisis scenario from scratch each time a cyber crisis report is analyzed. This approach enhances the speed of cyber crisis scenario generation.

The description will now return to FIG. 2.

After step S500, the cyber crisis scenario generation model 15 may automatically generate a cyber crisis scenario based on the attack procedure-related data and the cyber crisis scenario template (S600). The cyber crisis scenario generation model 15 may automatically generate a cyber crisis scenario by adding execution elements corresponding to the threat behavior data included in the cyber crisis scenario template.

The cyber crisis scenario generation model 15 may add execution elements corresponding to the threat behavior data included in the cyber crisis scenario template from the list of execution elements. For example, for the first attack procedure, the cyber crisis scenario generation model 15 may add an execution element, "COMP-001," from the list of execution elements that correspond to the threat behavior data of the first attack procedure. For the second attack procedure, the cyber crisis scenario generation model 15 may add execution elements, "COMP-002" and "COMP-003," from the list of execution elements that correspond to the threat behavior data of the second attack procedure.

Unlike a cyber crisis scenario template, a cyber crisis scenario may include actual attack procedures and methods. That is, while a cyber crisis scenario template only documents attack procedures and methods by mapping to TTPs defined in the MITRE ATT&CK framework, the cyber crisis scenario may precisely replicate the attack described in the cyber crisis report 20 by mapping to actually executable components.

According to this embodiment, by adding executable execution elements to a cyber crisis scenario template, various cyber crisis scenarios that involve real cyberattacks can be generated. Therefore, diverse cyber crisis scenarios can be created by combining reusable cyber crisis scenario templates with execution elements, thereby reducing the resources required for cyber crisis scenario generation.

A method for generating a cyber crisis scenario template according to some embodiments of the present disclosure will hereinafter be described with reference to FIG. 6. is a detailed flowchart illustrating specific operations of the cyber crisis scenario generation method according to some embodiments of the present disclosure.

Figure 6:
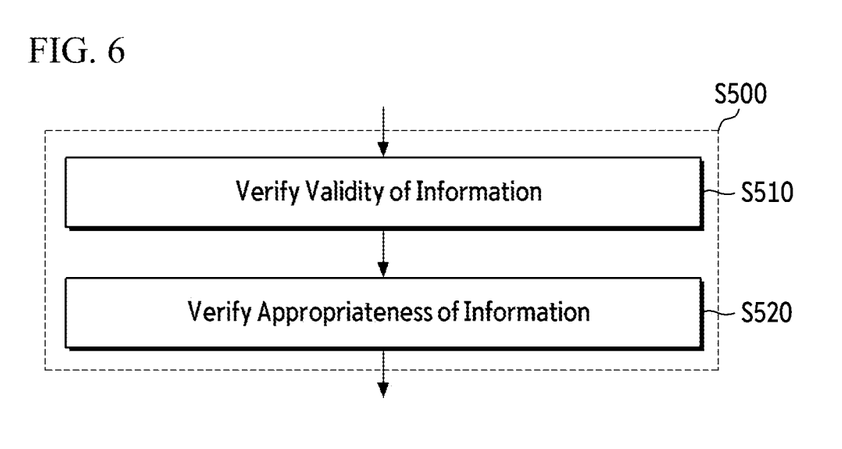
FIG. 6 is a detailed flowchart illustrating specific operations of the cyber crisis scenario generation method according to some embodiments of the present disclosure.

Referring to FIG. 6, the cyber crisis scenario generation model 15 may verify the validity of information as to whether the cyber crisis scenario template includes all the content of the cyber crisis report 20 (S510). Additionally, the cyber crisis scenario generation model 15 may verify the appropriateness of information as to whether the threat behavior data corresponding to the attack procedure-related data is properly matched to TTPs defined in the MITRE ATT&CK framework (S520).

After generating the cyber crisis scenario template by mapping to the unique identification information of TTPs, the cyber crisis scenario generation model 15 needs to analyze it using the text processing model 13 and the image processing model 12 to ensure the reliability of the cyber crisis scenario template. Accordingly, the scenario automatic generation system 10 needs to perform information validity and appropriateness validation processes to verify whether all the attack information and attack procedure-specific threat behaviors recorded in the cyber crisis report 20 are included and whether all the attack procedures recorded in the cyber crisis report 20 are properly matched to TTPs. The cyber crisis scenario generation model 15 may perform these validation processes using an AI model (e.g., a large-scale language model (LLM)).

In one embodiment, the cyber crisis scenario generation model 15 may automatically generate a cyber crisis scenario only when both the validity and appropriateness of the cyber crisis scenario template have been successfully verified. That is, by ensuring that the validity and appropriateness of the cyber crisis scenario template have been verified, the generated cyber crisis scenario can be logically executable as an attack sequence, thereby enabling the creation of a cyber crisis scenario that can be realistic.

Figure 7:
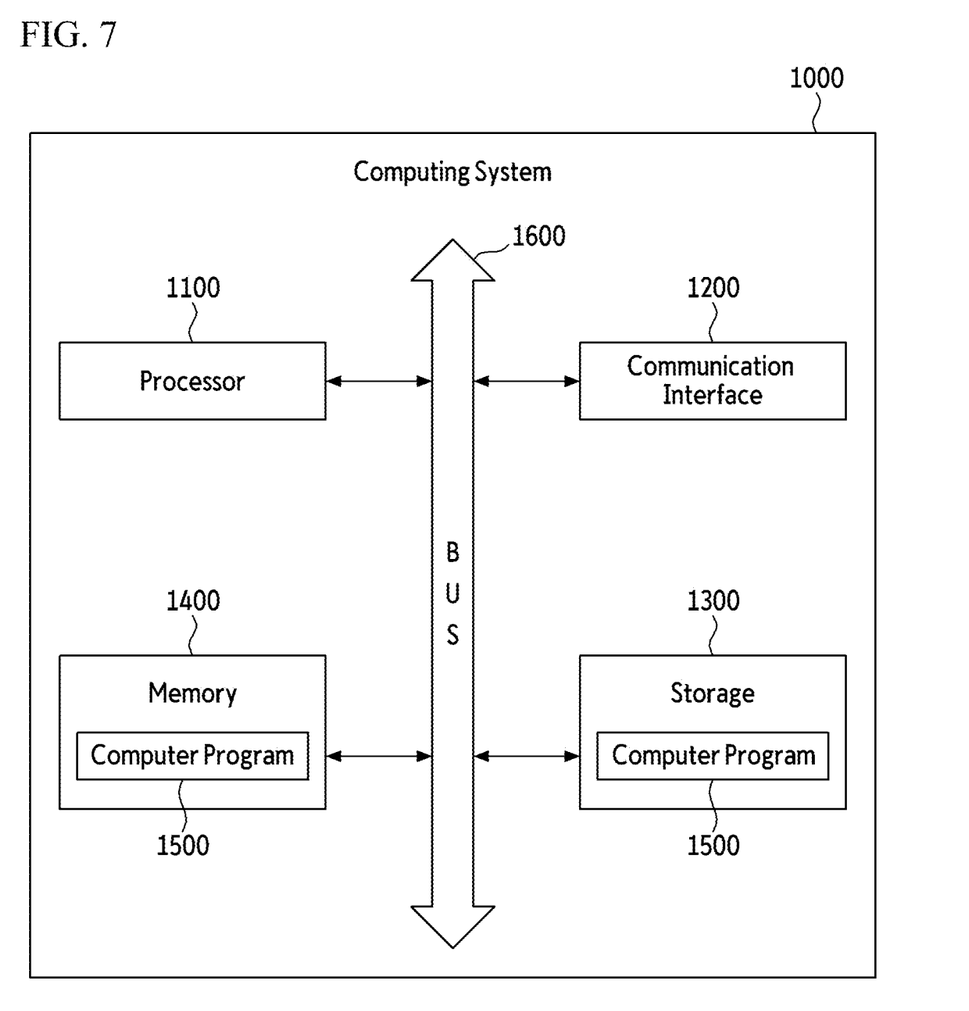
FIG. 7 is a diagram of an exemplary computing system capable of implementing systems according to some embodiments of the present disclosure.

An exemplary computing system 1000 capable of implementing a cyber crisis scenario automatic generation system 10 according to some embodiments of the present disclosure will hereinafter be described with reference to FIG. 7. FIG. 7 is a diagram of an exemplary computing system capable of implementing systems according to some embodiments of the present disclosure.

Referring to FIG. 7, the computing system 1000 may include at least one processor 1100, a system bus 1600, a communication interface 1200, a memory 1400 for loading a computer program 1500 to be executed by the processor 1100, and a storage 1300 for storing the computer program 1500.

The computing system 1000 may, for example, represent the hardware structure of one or more computing devices constituting the cyber crisis scenario automatic generation system 10 described with reference to FIG. 1.

The processor 1100 controls the overall operation of each component of the computing system 1000. The processor 1100 may perform computation for executing at least one application or program to perform methods/operations according to various embodiments of the present disclosure. The memory 1400 stores various data, commands, and/or information. The memory 1400 may load one or more computer programs 1500 from the storage 1300 to execute the methods/operations according to various embodiments of the present disclosure. The storage 1300 may non-transiently store one or more computer programs 1500.

The computer program 1500 may include one or more instructions that implement the methods/operations according to various embodiments of the present disclosure. When the computer program 1500 is loaded into the memory 1400, the processor 1100 may execute the instructions to perform the methods/operations according to various embodiments of the present disclosure.

In one embodiment, the computer program 1500 may include instructions for performing the operations of: classifying the types of content included in a cyber crisis report and extracting image data and text data from the cyber crisis report; inputting the image data into an image processing model and extracting attack procedure/behavior information from the image data; inputting the text data into a text processing model and generating structured attack procedure-related data from each attack procedure included in the text data; generating threat behavior data corresponding to the attack procedure-related data using unique identification information of TTPs defined in the MITRE ATT&CK framework and merging the threat behavior data with the attack procedure-related data; matching the attack procedure-related data to the attack procedure/behavior information and generating a cyber crisis scenario template; and automatically generating a cyber crisis scenario based on the attack procedure-related data and the cyber crisis scenario template.

So far, a variety of embodiments of the present disclosure and the effects according to embodiments thereof have been mentioned with reference to FIGS. 1 to 7. The effects according to the technical idea of the present disclosure are not limited to the forementioned effects, and other unmentioned effects may be clearly understood by those skilled in the art from the description of the specification.

The methods according to the embodiments of the present disclosure described above may be performed by executing a computer program implemented using a computer-readable code. The computer program may be transmitted from a first computing device to a second computing device via a network such as the Internet and installed on the second computing device, and may be used by the second computing device. Furthermore, although the operations are illustrated in a specific order in the drawings, it should not be understood that the operations should be executed in the specific order as illustrated or in a sequential order or that all illustrated operations should be executed to acquire a desired result. In certain situations, multitasking and parallel processing may be advantageous.

Although some embodiments of the present disclosure have been described above with reference to the accompanying drawings, the present disclosure may not be limited to some embodiments and may be implemented in various different forms. Those of ordinary skill in the technical field to which the present disclosure belongs will be able to appreciate that the present disclosure may be implemented in other specific forms without changing the technical idea or essential features of the present disclosure. Therefore, it should be understood that some embodiments as described above are not restrictive but illustrative in all respects.

What is claimed is:

1. A method for automatically generating a cyber crisis scenario, performed by a computing system, the method comprising:

classifying types of content included in a cyber crisis report and extracting image data and text data from the cyber crisis report;

inputting the image data into an image processing model and extracting attack procedure/behavior information included in the image data using an analysis result of the image data obtained from the image processing model;

inputting the text data into a text processing model and generating structured attack procedure-related data from each attack procedure included in the text data using an analysis result of the text data obtained from the text processing model;

generating threat behavior data corresponding to the attack procedure-related data using unique identification information of Tactics, Techniques, and Procedures (TTPs) defined in the MITRE ATT&CK framework, and merging the threat behavior data with the attack procedure-related data;

matching the attack procedure-related data to the attack procedure/behavior information and generating a cyber crisis scenario template; and automatically generating a cyber crisis scenario by combining the cyber crisis scenario template with execution elements corresponding to the threat behavior data included in the cyber crisis scenario template.

2. The method of claim 1, wherein the extracting the attack procedure/behavior information comprises: defining components included in the image data and relationships between the components; and extracting the attack procedure/behavior information based on the components and the relationships.

3. The method of claim 1, wherein the generating the structured attack procedure-related data comprises generating unique execution order identification information for a first attack procedure and a second attack procedure included in the text data based on an execution sequence.

4. The method of claim 3, wherein the generating the cyber crisis scenario template comprises: determining whether content of the first and second attack procedures includes all content of the attack procedures recorded in the cyber crisis report based on the attack procedure/behavior information; and determining, based on a result of the determination, whether the first and second attack procedures match the respective attack procedures recorded in the cyber crisis report.

5. The method of claim 1, wherein the attack procedure-related data comprises information on a targeted organization, information on an executed attack, and tags for the executed attack.

6. The method of claim 5, wherein the generating the threat behavior data corresponding to the attack procedure-related data comprises: performing semantic analysis on the information on the executed attack; and matching the executed attack to a corresponding TTP identifier (ID) defined in the MITRE ATT&CK framework based on a result of the semantic analysis.

7. The method of claim 1, wherein the generating the cyber crisis scenario template comprises: verifying validity of information as to whether the cyber crisis scenario template includes all the content of the cyber crisis report; and verifying appropriateness of information as to whether the threat behavior data is properly matched to TTPs defined in the MITRE ATT&CK framework.

8. The method of claim 7, wherein the automatically generating the cyber crisis scenario comprises automatically generating the cyber crisis scenario only when both the validity and appropriateness of the information have been successfully verified.

9. A cyber crisis scenario automatic generation system comprising:
   a communication interface;
   a memory configured to load a computer program; and
   at least one processor configured to execute the computer program,
   wherein the computer program includes instructions for performing operations of: classifying types of content included in a cyber crisis report and extracting image data and text data from the cyber crisis report; inputting the image data into an image processing model and extracting attack procedure/behavior information included in the image data using an analysis result of the image data obtained from the image processing model; inputting the text data into a text processing model and generating structured attack procedure-related data from each attack procedure included in the text data using an analysis result of the text data obtained from the text processing model; generating threat behavior data corresponding to the attack procedure-related data using unique identification information of Tactics, Techniques, and Procedures (TTPs) defined in the MITRE ATT&CK framework, and merging the threat behavior data with the attack procedure-related data; matching the attack procedure-related data to the attack procedure/behavior information and generating a cyber crisis scenario template; and automatically generating a cyber crisis scenario by combining the cyber crisis scenario template with execution elements corresponding to the threat behavior data included in the cyber crisis scenario template.

10. The system of claim 9, wherein the operation of extracting the attack procedure/behavior information comprises: defining components included in the image data and relationships between the components; and extracting the attack procedure/behavior information based on the components and the relationships.

11. The system of claim 9, wherein the operation of generating the structured attack procedure-related data comprises generating unique execution order identification information for a first attack procedure and a second attack procedure included in the text data based on an execution sequence.

12. The system of claim 11, wherein the operation of generating the cyber crisis scenario template comprises: determining whether content of the first and second attack procedures includes all content of the attack procedures recorded in the cyber crisis report based on the attack procedure/behavior information; and determining, based on a result of the determination, whether the first and second attack procedures match the respective attack procedures recorded in the cyber crisis report.

13. The system of claim 9, wherein the attack procedure-related data comprises information on a targeted organization, information on an executed attack, and tags for the executed attack.

14. The system of claim 13, wherein the operation of generating the threat behavior data corresponding to the attack procedure-related data comprises: performing semantic analysis on the information on the executed attack; and matching the executed attack to a corresponding TTP identifier (ID) defined in the MITRE ATT&CK framework based on a result of the semantic analysis.

15. The system of claim 9, wherein the operation of generating the cyber crisis scenario template comprises: verifying validity of information as to whether the cyber crisis scenario template includes all the content of the cyber crisis report; and verifying appropriateness of information as to whether the threat behavior data is properly matched to TTPs defined in the MITRE ATT&CK framework.

16. The system of claim 15, wherein the operation of automatically generating the cyber crisis scenario comprises automatically generating the cyber crisis scenario only when both the validity and appropriateness of the information have been successfully verified.

17. A non-transitory computer-readable storage medium storing a computer program that performs, in conjunction with a computing device, operations of:
   classifying types of content included in a cyber crisis report and extracting image data and text data from the cyber crisis report;
   inputting the image data into an image processing model and extracting attack procedure/behavior information included in the image data using an analysis result of the image data obtained from the image processing model;
   inputting the text data into a text processing model and generating structured attack procedure-related data from each attack procedure included in the text data using an analysis result of the text data obtained from the text processing model;
   generating threat behavior data corresponding to the attack procedure-related data using unique identification information of Tactics, Techniques, and Procedures (TTPs) defined in the MITRE ATT&CK framework, and merging the threat behavior data with the attack procedure-related data;
   matching the attack procedure-related data to the attack procedure/behavior information and generating a cyber crisis scenario template; and
   automatically generating a cyber crisis scenario by combining the cyber crisis scenario template with execution elements corresponding to the threat behavior data included in the cyber crisis scenario template.

* * * * *